US012594149B2

(12) United States Patent
Fulks

(10) Patent No.: US 12,594,149 B2
(45) Date of Patent: Apr. 7, 2026

(54) ORTHODONTIC TUBE SYSTEM

(71) Applicant: Clayton M. Fulks, Hendersonville, TN (US)

(72) Inventor: Clayton M. Fulks, Hendersonville, TN (US)

( * ) Notice: Subject to any disclaimer, the term of this patent is extended or adjusted under 35 U.S.C. 154(b) by 403 days.

(21) Appl. No.: 18/119,057

(22) Filed: Mar. 8, 2023

(65) Prior Publication Data

US 2024/0299139 A1 Sep. 12, 2024

(51) Int. Cl.
*A61C 7/28* (2006.01)

(52) U.S. Cl.
CPC .................................... *A61C 7/282* (2013.01)

(58) Field of Classification Search
CPC ........... A61C 7/282; A61C 7/287; A61C 7/36; A61C 7/14; A61C 7/12; A61C 7/20
See application file for complete search history.

(56) References Cited

U.S. PATENT DOCUMENTS

| | | | | |
|---|---|---|---|---|
| 2,549,528 A | * | 4/1951 | Russell | A61C 7/287 |
| | | | | D24/180 |
| 3,055,110 A | * | 9/1962 | Kesling | A61C 7/282 |
| | | | | 433/17 |
| 3,618,214 A | * | 11/1971 | Armstrong | A61C 7/36 |
| | | | | 267/179 |
| 4,192,070 A | | 3/1980 | Lemchen et al. | |
| 5,011,404 A | * | 4/1991 | Losi | A61C 7/36 |
| | | | | 433/21 |
| 5,380,197 A | * | 1/1995 | Hanson | A61C 7/20 |
| | | | | 433/18 |
| 9,113,984 B2 | | 8/2015 | Kesling | |
| 9,615,898 B2 | * | 4/2017 | Ariza | A61C 7/141 |
| 11,510,757 B2 | | 11/2022 | Khoshnevis et al. | |
| 2003/0064343 A1 | * | 4/2003 | Devanathan | A61C 7/16 |
| | | | | 433/17 |
| 2011/0053108 A1 | * | 3/2011 | Ariza | A61C 7/282 |
| | | | | 433/17 |
| 2018/0228576 A1 | * | 8/2018 | Erskine-Smith | A61C 7/282 |
| 2020/0069396 A1 | * | 3/2020 | Gessel | A61C 7/282 |
| 2024/0299139 A1 | * | 9/2024 | Fulks | A61C 7/287 |

* cited by examiner

*Primary Examiner* — Ralph A Lewis
(74) *Attorney, Agent, or Firm* — Bryan W. Bockhop; Bockhop Intellectual Property Law, LLC

(57) ABSTRACT

In an orthodontic system for use with a patient having an arch that includes a plurality of teeth. The orthodontic system includes an anchoring bracket; a first affixing mechanism, a tube and an archwire. The first affixing mechanism is configured to affix the anchoring bracket to a selected first one of the teeth. The tube is affixed to the anchoring bracket and is configured to extend along a portion of the arch. The archwire is secured to the anchoring bracket and extends from the tube. In a method of preventing damage to a portion of an archwire in an orthodontic braces set for moving a plurality of teeth, an anchoring bracket is affixed to a selected first one of the teeth. A tube is secured to the anchoring bracket so that the tube extends around the portion of the archwire.

18 Claims, 5 Drawing Sheets

ORTHODONTIC TUBE SYSTEM

BACKGROUND OF THE INVENTION

1. Field of the Invention

The present invention relates to orthodontic appliances and, more specifically, to an orthodontic appliance employing an archwire protecting tube.

2. Description of the Related Art

Conventional braces typically include an archwire coupled between two anchoring brackets and placed across the patient's teeth. The arch wire is typically held in place by a plurality of intermediate brackets that are affixed to the teeth between the anchoring brackets. The anchoring brackets are typically affixed to the rear-most molars of the patient with an adhesive. In some cases, the anchoring brackets are soldered to metal bands that are fitted around the patient's rear-most molars.

Pediatric patients often have gaps between teeth while waiting for adult teeth to grow into the locations of removed baby teeth. Chewing food can result in substantial pressures on the archwire in these gaps. Frequently, this pressure can result in the breaking of the archwire, which can result in damage to the tissues in the area of the broken archwire. Also, archwire breakage is one of the most common reasons for emergency visits to the orthodontist.

Therefore, there is a need for a system that prevents archwire breakage.

SUMMARY OF THE INVENTION

The disadvantages of the prior art are overcome by the present invention which, in one aspect, is an orthodontic system for use with a patient having an arch that includes a plurality of teeth. The orthodontic system includes an anchoring bracket; a first affixing mechanism, a tube and an archwire. The first affixing mechanism is configured to affix the anchoring bracket to a selected first one of the teeth. The tube is affixed to the anchoring bracket and is configured to extend along a portion of the arch. The archwire is secured to the anchoring bracket and extends from the tube.

In another aspect, the invention is an orthodontic appliance for use with a patient having an arch that includes a plurality of teeth. The orthodontic appliance includes an anchoring bracket that defines two parallel passages and that includes a door that selectively covers the two parallel grooves. A first affixing mechanism is configured to affix the anchoring bracket to a selected first one of the teeth. A tube is affixed to the anchoring bracket and is configured to extend along a portion of the arch. The tube has a proximal end and includes: two parallel wires that extend from proximal end of the tube, each having a first end, wherein each of the parallel wires is configured to fit into a different one of the parallel grooves and a stop that couples the first ends of the two parallel wires and that is placed outside of the anchoring bracket so that when the door is in a closed position, the two parallel wires hold the tube in a fixe d relation to the anchoring bracket. An archwire is secured to the anchoring bracket and extends from the tube.

In yet another aspect, the invention is a method of preventing damage to a portion of an archwire in an orthodontic braces set for moving a plurality of teeth, in which an anchoring bracket is affixed to a selected first one of the teeth. A tube is secured to the anchoring bracket so that the tube extends around the portion of the archwire.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figures 1, 2A, 2B, 2C:
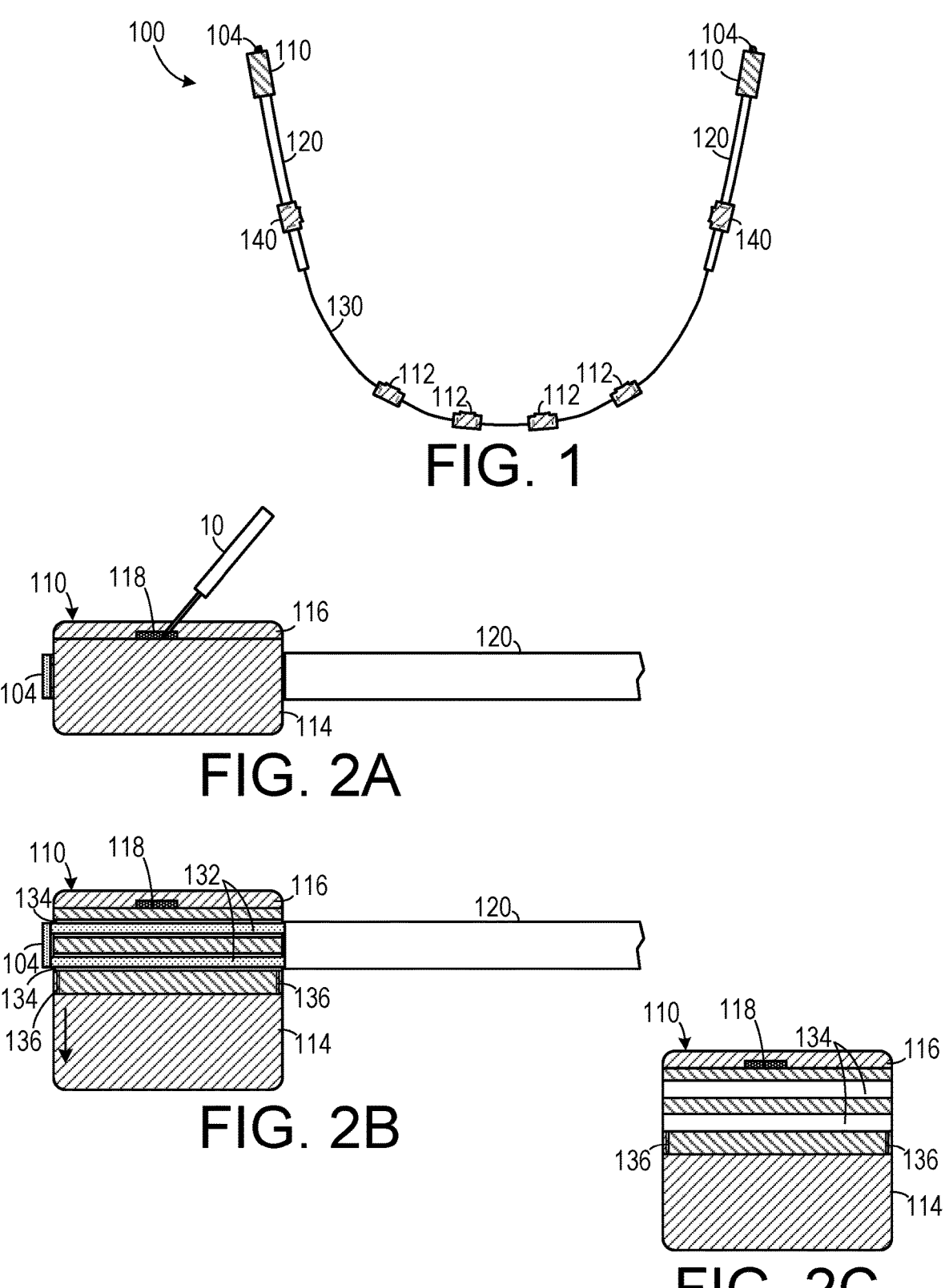
FIG. 1 is a schematic diagram of one embodiment of an orthodontic tube system.
FIG. 2A is a schematic diagram of a door-type anchoring bracket with a tube attached thereto in which the door is closed.
FIG. 2B is a schematic diagram of a door-type anchoring bracket with a tube attached thereto in which the door is open.
FIG. 2C is a schematic diagram of a door-type anchoring bracket without a tube attached.
Figures 3A, 3B:
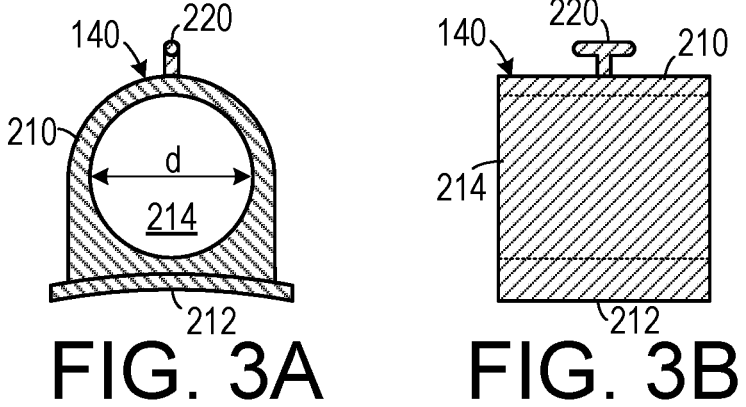
FIGS. 3A and 3B are schematic diagrams of a tube receptive intermediate bracket without a tube passing therethrough.
Figures 3C, 3D:
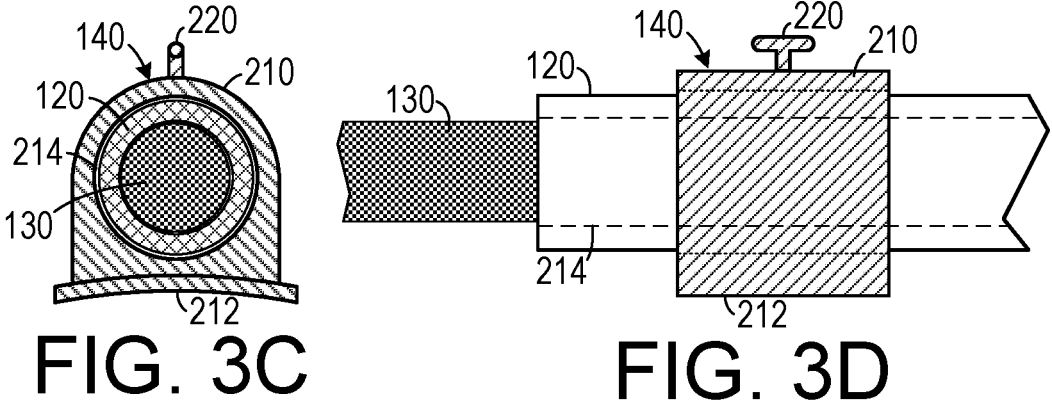
FIGS. 3C and 3D are schematic diagrams of a tube receptive intermediate bracket with a tube and archwire passing therethrough.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of an orthodontic tube system 100 includes a pair of anchoring brackets 110 that anchor two tubes 120 through which an archwire 130 passes. The anchoring brackets 110 are affixed to molars and used to secure the tubes 120 and the archwire 130 to the patient's teeth. In one embodiment, the anchoring brackets 110 can be of the self-ligating type. The archwire 130 passes through a plurality of intermediate brackets 112 and eyelet brackets 140 can be employed to support the tubes 120. A plurality of different lengths of tubes 120 can be employed by the orthodontist to meet the specific needs of the patient at different times during treatment.

As shown in FIGS. 2A-2C, in one representative embodiment, the anchoring bracket 110 includes a door 114 that can be moved between a closed position (as show in FIG. 2A) and an open position (as shown in FIG. 2B). To open the door 114, the orthodontist places an instrument 10 in a slot 118, thereby pushing the door 114 along a rail 136 into the opened position. The inside of the anchoring bracket 110 defines two parallel grooves 134 into which two wires 132 are placed. The two wires 132 are affixed to a tube 120 (or can be affixed to the archwire 130) on one end and to a stop 104 at the other end. The stop 104 holds the two wires 132 laterally in the anchoring bracket 110. Once the wires 132 are placed in the grooves 134, the door 114 is slid to the closed position and held shut by a detent 118 that fits with the slot 118, which holds the wires 132 in a fixed relation to the anchoring bracket 110. Once emplaced, the stop 104 can be synched inwardly to prevent irritation.

While conventional intermediate brackets 112 can be employed to hold the archwire 130, tube-specific intermediate eyelet brackets 140, as shown in FIGS. 3A-3D, can be used to support the tube 120. A tube-specific intermediate bracket 140 includes a body portion 210 and an attachment surface 212, which can be secured to a tooth with an orthodontic glue adhesive. The body portion 210 defines a hole 214 passing therethrough with an interior diameter d that is sufficient to allow the tube 120 to pass therethrough. A hook 220 (which can be a T-shaped bidirectional hook or an L-shaped unidirectional hook) can extend from the body portion 210 and can be used for securing elastic bands and power chains, etc., thereto.

Figure 4:
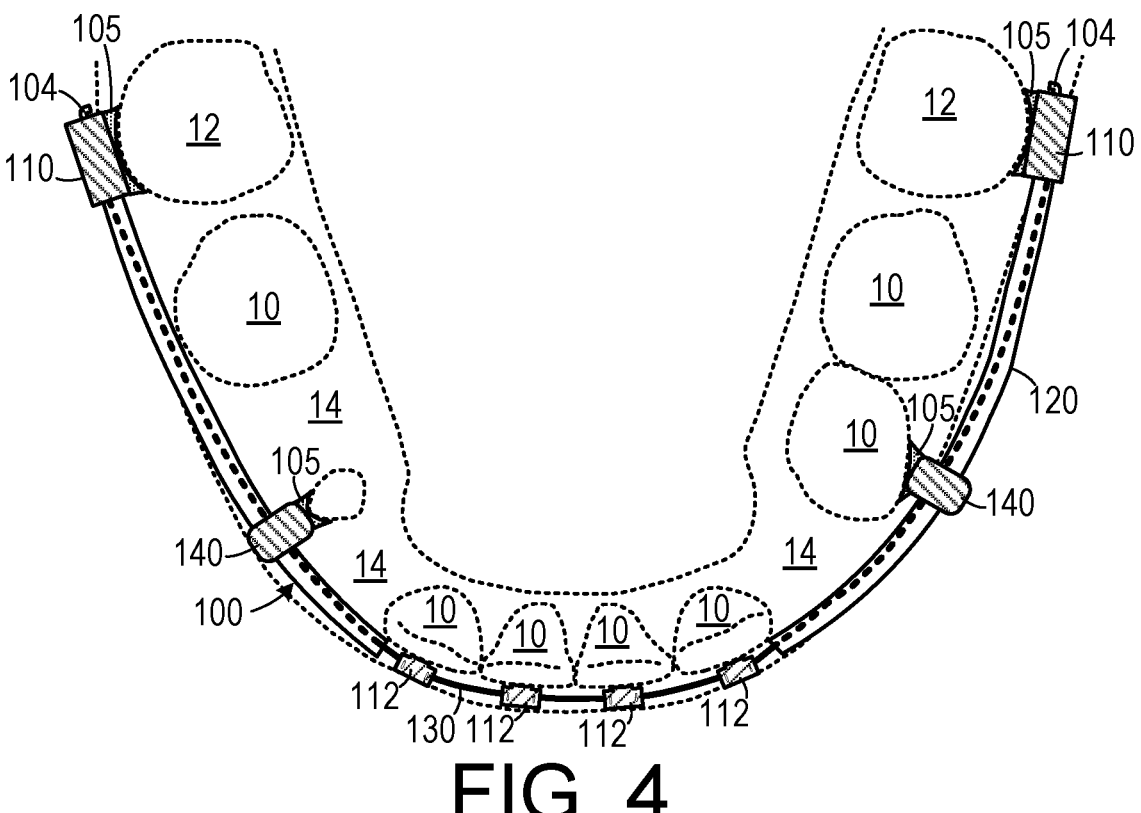
FIG. 4 is a schematic diagram of a first embodiment of an orthodontic tube system installed on a set of teeth.

An orthodontic tube system 100 applied to a patient's teeth 10 and 12 is shown in FIG. 4. In this embodiment, the anchor brackets 110 are affixed to the rear-most molars 12 with orthodontic glue 105. The tubes 120 bypass gaps 14 between teeth 10 to protect the archwire 130 from breakage. The tubes 120 can also be used to bypass selected molars.

Figure 5:
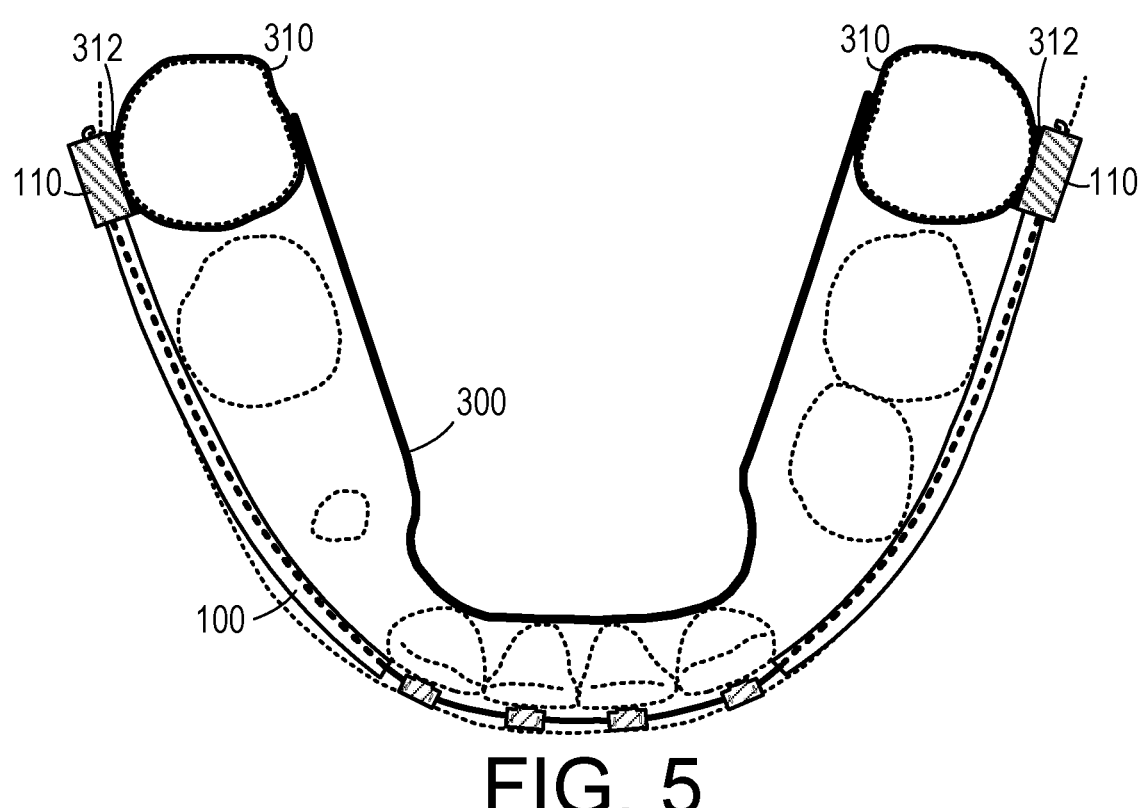
FIG. 5 is a schematic diagram of a second embodiment of an orthodontic tube system installed on a set of teeth.
Figure 6:
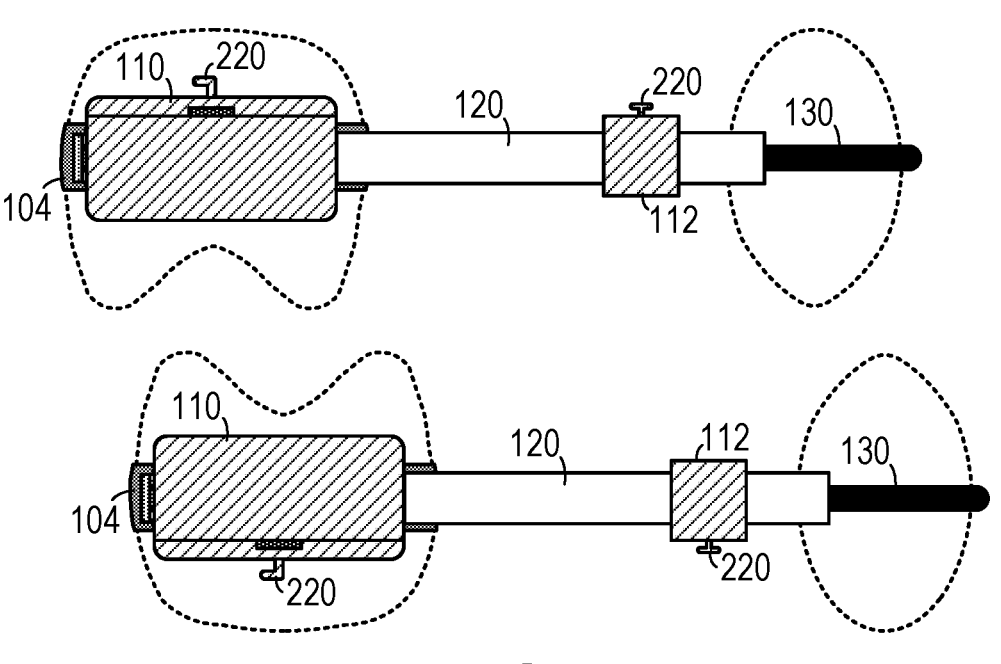
FIG. 6 is a schematic diagram of two orthodontic tube system installed on a partial set of teeth.

Another embodiment is shown in FIG. 5, in which metal bands 310 are fitted to the molars. The anchoring brackets 110 are affixed to the metal bands 310 with solder 312. A lingual arch 300 can also be soldered to the metal bands 310. Partial side views of the orthodontic tube system 100 applied to both upper and lower teeth are shown in FIG. 6.

Figure 7:
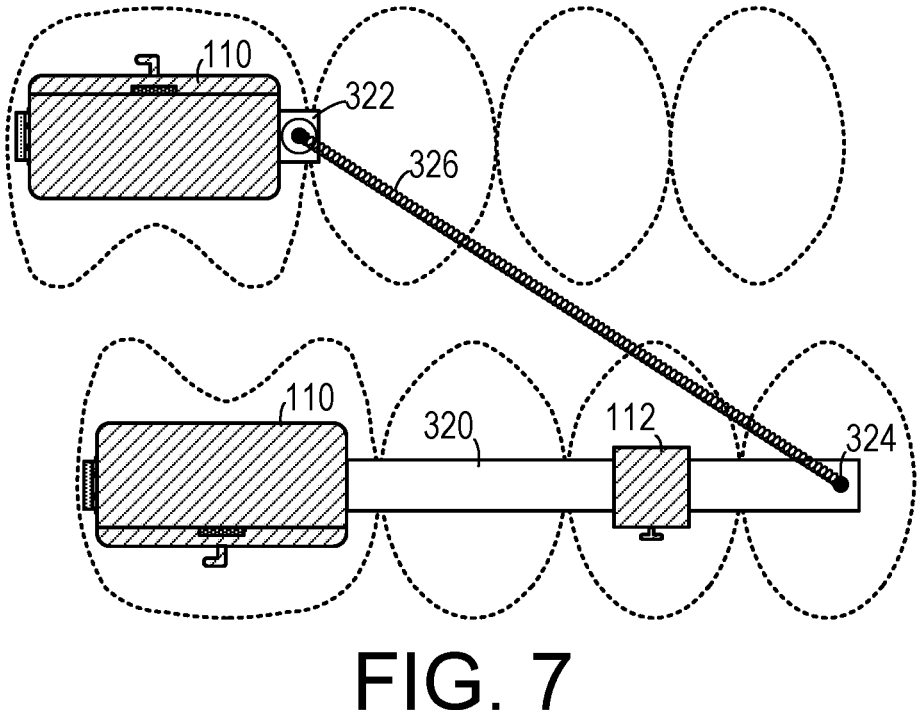
FIG. 7 is a schematic diagram of two orthodontic tube system installed on a partial set of teeth in which a spring system is employed to adjust the patient's jaw.

As shown in FIG. 7, the tube system can be employed for affixing devices such as springs 326 used to assist in moving a jaw forward or backward. A first spring anchor 322 can be coupled to one anchor bracket 110 and a second spring anchor 324 can be coupled a distal end of a tube 320. A coil spring 326 or a spring rod can then be secured to the first spring anchor 322 and the second spring anchor 324, which can be done using, for example, Allen wrench screws.

In the present invention, the tube itself is removable so that, as treatment progresses and when the tube is no longer required, it can be removed and the archwire by itself can be secured to the anchor bracket. As a result, the present invention is multifunctional and gives the orthodontist the ability to use it with brackets and wires, or with the tubes according to the patient's treatment progress. In a course of treatment, the orthodontist can start with conventional braces and then add the tubes later without having to remake and re-glue the fittings. The orthodontist can employ separate attachments that fit in the brackets on an as-needed basis as treatment progresses. The brackets, tubes and eyelets can be assembled extra-orally and stabilized with rope wax while awaiting oral placement. Molar tubes can be used as regular archwire slots. Occlusal slots can act as base archwires. Gingival slots can be used to have an auxiliary full sized wire to be steel tied to the anterior to create an intrusive force. Archwires can be first employed to de-rotate molars and then they can be replaced with tubes.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An orthodontic system for use with a patient having an arch that includes a plurality of teeth, comprising:
   (a) an anchoring bracket;
   (b) a first affixing mechanism configured to affix the anchoring bracket to a selected first one of the teeth;
   (c) a tube affixed to the anchoring bracket and configured to extend along a portion of the arch; and
   (d) an archwire secured to the anchoring bracket and extending from the tube,
   wherein the anchoring bracket defines two parallel grooves and includes a self-ligating door within which the extension tube is ligated, and
   wherein the door selectively covers the two parallel grooves, wherein the tube has a proximal end and includes:
      two parallel wires extending from proximal end of the tube, each having a first end, wherein each of the parallel wires is configured to fit into a different one of the parallel grooves; and
      a stop that couples the first ends of the two parallel wires and that is configured to be placed outside of the anchoring bracket so that when the door is in a closed position, the two parallel wires hold the tube in a fixed relation to the anchoring bracket.

2. The orthodontic system of claim 1, wherein the anchoring bracket includes:
   (a) a track along which the door slides selectively between a closed position and an open position; and
   (b) a detent that holds the door in the closed position,
      wherein the anchoring bracket defines a lacuna adjacent to an edge of the door that is configured to receive an instrument therein to facilitate opening of the door.

3. The orthodontic system of claim 1, further comprising at least one eyelet bracket, the eyelet bracket including a second affixing mechanism configured to affix the eyelet bracket to a selected second one of the teeth, the eyelet bracket defining a hole passing therethrough, the hole having an internal diameter that allows the tube to passively receive the extension tube therein.

4. The orthodontic system of claim 3, wherein the eyelet includes at least one hook extending therefrom, the hook configured to secure an elastic band thereto.

5. The orthodontic system of claim 1, wherein the anchoring bracket includes at least one hook extending therefrom, the hook configured to secure an elastic band thereto.

6. The orthodontic system of claim 1, wherein the tube has a length so that the tube protects the archwire in a region of the arch in which there is a gap between two of the teeth.

7. The orthodontic system of claim 1, wherein the first affixing mechanism comprises a wire mesh base that holds the anchoring bracket to the selected first one of the teeth when adhesive is applied thereto.

8. The orthodontic system of claim 1, wherein the first affixing mechanism comprises:

(a) a metallic band placed around the selected first one of the teeth; and (b) solder that affixes the metallic band to the anchoring bracket.

9. The orthodontic system of claim 1, wherein the patient has an upper arch to which a first anchoring bracket is affixed and an oppositely disposed lower arch to which a second anchoring bracket is affixed and along which the tube extends, the orthodontic system further comprising:

(a) a first spring anchor affixed to the first anchoring bracket;

(b) a second spring anchor affixed to a distal end of the tube; and (c) a coil spring that couples the first spring anchor to the second spring anchor.

10. An orthodontic appliance for use with a patient having an arch that includes a plurality of teeth, comprising:

(a) an anchoring bracket defining two parallel passages and including a door that selectively covers the two parallel grooves;

(b) a first affixing mechanism configured to affix the anchoring bracket to a selected first one of the teeth;

(c) a tube affixed to the anchoring bracket and configured to extend along a portion of the arch, the tube having a proximal end and including:

(i) two parallel wires extending from proximal end of the tube, each having a first end, wherein each of the parallel wires is configured to fit into a different one of the parallel grooves; and (ii) a stop that couples the first ends of the two parallel wires and that is placed outside of the anchoring bracket so that when the door is in a closed position, the two parallel wires hold the tube in a fixe d relation to the anchoring bracket; and (d) an archwire secured to the anchoring bracket and extending from the tube.

11. The orthodontic appliance of claim 10, wherein the anchoring bracket includes:

(a) a track along which the door slides selectively between a closed position and an open position; and (b) a detent that holds the door in the closed position, wherein the anchoring bracket defines a lacuna adjacent to an edge of the door that is configured to receive an instrument therein to facilitate opening of the door.

12. A method of preventing damage to a portion of an archwire in an orthodontic braces set for moving a plurality of teeth, comprising the steps of:

(a) affixing an anchoring bracket to a selected first one of the teeth; and (a) securing a tube to the anchoring bracket so that the tube extends around the portion of the archwire, wherein the anchoring bracket defines two parallel passages and includes a door that selectively covers the two parallel grooves, wherein the tube has a proximal end and includes: two parallel wires extending from proximal end of the tube, each having a first end; and a stop that couples the first ends of the two parallel wires, the method further comprising the steps of:

placing each of the parallel wires into a different one of the parallel grooves and placing the stop outside of the anchoring bracket; and closing the door so that the two parallel wires hold the tube in a fixed relation to the anchoring bracket.

13. The method of claim 12, wherein the anchoring bracket includes a track along which the door slides selectively between a closed position and an open position and a detent that holds the door in the closed position, wherein the anchoring bracket defines a lacuna adjacent to an edge of the door that is configured to receive an instrument therein to facilitate opening of the door, the method further comprising the step of placing a tip of an instrument in the lacuna and opening the door by applying force to the tip of the instrument.

14. The method of claim 12, further comprising the steps of:

(a) securing an eyelet bracket to a selected second one of the teeth, the eyelet defining a hole passing therethrough; and (b) passing a portion of the tube through the hole so that the eyelet supports the portion of the tube.

15. The method of claim 12, further comprising the step of selecting a length for the tube so that the tube protects the archwire in a region of the arch in which there is a gap between two of the teeth.

16. The method of claim 12, further comprising the step of affixing the anchoring bracket to the selected first one of the teeth with an adhesive.

17. The method of claim 12, further comprising the steps of:

(a) soldering the metallic band to the anchoring bracket; and (b) placing a metallic band around the selected first one of the teeth.

18. The method of claim 12, wherein the patient has an upper arch to which a first anchoring bracket is affixed and an oppositely disposed lower arch to which a second anchoring bracket is affixed and along which the tube extends, the orthodontic system further comprising steps of:

(a) anchoring a first end of a coil spring to the first anchoring bracket; and (b) anchoring a second end of the coil spring to a distal end of the tube.

* * * * *